United States Patent [19]
Kim

[11] Patent Number: 5,995,397
[45] Date of Patent: Nov. 30, 1999

[54] POWER SUPPLY CONTROLLING APPARATUS FOR PRINTER

[75] Inventor: Min-seon Kim, Suwon, Rep. of Korea

[73] Assignee: Samsung Electronics Co. Ltd., Kyungki-Do, Rep. of Korea

[21] Appl. No.: 09/129,217

[22] Filed: Aug. 5, 1998

[30] Foreign Application Priority Data

Aug. 27, 1997 [KR] Rep. of Korea ............... 97-41631

[51] Int. Cl.$^6$ .................. H02M 3/24; H02M 3/335; G03G 15/00
[52] U.S. Cl. .................. 363/97; 363/21; 399/88
[58] Field of Search .................. 363/97, 21, 20, 363/16, 17; 399/88

[56] References Cited

U.S. PATENT DOCUMENTS

| | | | |
|---|---|---|---|
| 5,132,891 | 7/1992 | Kobayashi et al. | 363/21 |
| 5,497,311 | 3/1996 | Hanawaka | 363/21 |
| 5,499,184 | 3/1996 | Squibb | 363/21 |
| 5,546,161 | 8/1996 | Sakai et al. | 399/88 |

*Primary Examiner*—Robert E. Nappi
*Assistant Examiner*—Rajnikant B. Patel
*Attorney, Agent, or Firm*—Sughrue, Mion, Zinn, Macpeak & Seas, PLLC

[57] ABSTRACT

A power supply controlling apparatus for a printer is provided which includes a switching unit connecting and disconnecting a discharge path of current rectified by a first rectifier receiving power from an external alternating current (AC) power supply, a switching controlling unit controlling the connection and disconnection of the switching unit, and a second rectifier rectifying electric energy induced in the second winding to generate a voltage for operating the printer. Also provided are a first switch operating unit for outputting a first control signal to switch a power supply line on and off which is connected to the switching controlling unit based on the on/off state of the first switch, a second switch capable of connecting and separating the power supply line connected to the switching controlling unit, a system controlling unit for receiving the first control signal and determining the printing state to output a second control signal allowing the second switch to be switched on and off, and a second switch controlling unit receiving the first and second control signals to switch on and off the second switch. Thus, even though the first switch capable of controlling supply and interruption of power to and from the printer is forcibly switched off due to carelessness during printing, the supply of power required for completing a remaining printing operation is continued, thereby suppressing contamination of printer elements due to forcible interruption of operation.

11 Claims, 2 Drawing Sheets

POWER SUPPLY CONTROLLING APPARATUS FOR PRINTER

BACKGROUND OF THE INVENTION

1. Field of the Invention

The present invention relates to a power supply controlling apparatus for a printer, and more particularly, to a power supply controlling apparatus capable of continuing supply of power required to complete printing operation even though a power switch is turned off during printing operation.

The present application is based upon Korean Application No. 97-41631, which is incorporated herein by reference.

2. Description of the Related Art

Referring to FIG. 1, a typical color printer includes a resetting apparatus 15, laser scanning units 16, developing apparatuses 17, a drying apparatus 18 and a transferring apparatus 20 are arranged adjacent to a circulation path of a photosensitive belt 14 circulated by three rollers 11, 12 and 13 and spaced apart from each other by a predetermined distance.

In the process of printing, the laser scanning unit 16 scans light beams over a predetermined region of the photosensitive belt 14 circulating via the resetting apparatus 15. An electrostatic latent image is formed on the photosensitive belt 14 by the scanned light, and the electrostatic latent image is developed by a developer supplied from a developing apparatus 17. A color image is formed on the photosensitive belt 14 by the laser scanning units 16 scanning light beams of various colors and the developing apparatuses 17 developing the scanned image by the developer corresponding to the light beam. The color image formed on the photosensitive belt 14 by a developer is primarily transferred to a transfer roller 21, which rotates partially in contact with the photosensitive belt 14, via the drying apparatus 18. Then, the image formed on the transfer roller 21 is secondarily transferred onto a sheet of paper 23 proceeding forward according to rotation of the transfer roller 21 and a pressure roller 22 which press against each other with the paper 23 therebetween.

Meanwhile, a power switch (not shown) with which a user can interrupt or connect an external commercialized alternating current (AC) power supply with respect to the inside of the printer is typically provided outside the main body. When the power switch is turned off due to a user's mistake or carelessness during a printing operation of the printer, the printing operation is interrupted due to interruption of the power supply. If the power supply is interrupted during the printing operation, the developing material which is not yet transferred to the paper sheet 23 remains on the photosensitive belt 14 or the transfer roller 21, thereby causing contamination of elements. Also, if the contamination is not instantly removed, the printing quality may be severely damaged.

SUMMARY OF THE INVENTION

To solve the above problem, it is an objective of the present invention to provide a power supply controlling apparatus for a printer continuously supplying power required to complete the remaining printing even though a power supply switch is turned off during printing.

Accordingly, to achieve the above objective, a power supply control apparatus according to the present invention comprises: a first rectifier rectifying current supplied by an external alternating current (AC) power supply; a switching unit capable of connecting and disconnecting a discharge path of current charged in the first rectifier; a switching controlling unit controlling the connection and disconnection of the switching unit; a first switch operating unit for outputting a first control signal to switch on and off a power supply line connected to the switching controlling unit according to the on and off state of the first switch; a second switch capable of connecting/separating the power supply line connected to the switching controlling unit; a system controlling unit for controlling overall operations of the printer, receiving the first control signal to determine the on and off state of the first switch, and determining the printing state to output a second control signal allowing the second switch to be switched on and off; and a second switch controlling unit receiving the first and second control signals to switch the second switch on and off.

Preferably, the apparatus further includes a transformer having at least one second winding inductively coupled to a first winding installed in the discharge path; a second rectifier rectifying electric energy induced in the second winding to generate a voltage required for the printer; and a third rectifier transforming power supplied by the external AC power supply to produce a direct current (DC) voltage for the switching controlling unit.

It is also preferable that the first switch operating unit comprises: a comparator comparing signals of first and second input ends to output the compared result as the first control signal; and a first switch operating signal generator supplying a first reference voltage signal to the first input end, and outputting one of a second voltage signal having a level higher than the first reference voltage level and a third voltage signal having a level lower than the first reference voltage level, to the second input end according to the on and off operations of the first switch. Also, the first switch is installed on an outer circumference or surface of the printer so as to be accessible for use by a user.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 2:
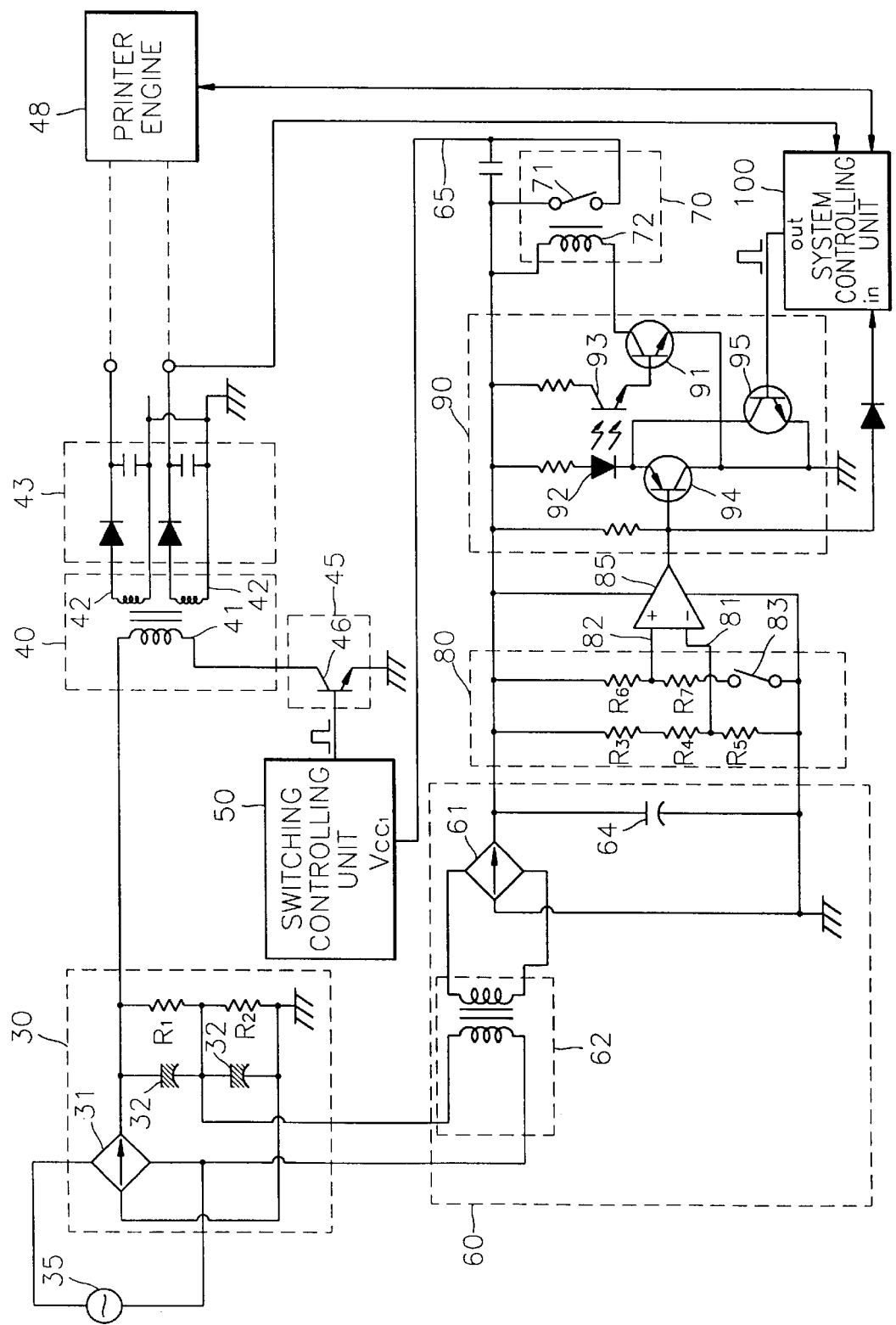
FIG. 2 is a circuit diagram of a power supply controlling apparatus for a printer according to a preferred embodiment of the present invention.

Referring to FIG. 2, a power supply controlling apparatus for a printer includes a first rectifier 30 for rectifying the voltage from an external alternating current (AC) power supply 35. A bridge diode 31 provided in the first rectifier 30 rectifies the voltage and current from the external AC power supply 35 (e.g., a common AC power supply such as 110$V_{AC}$ or 220$V_{AC}$) and capacitors 32 are charged by current flowing through the bridge diode 31. Resistors R1 and R2 are for discharge.

A first winding 41 of a transforming unit 40 is connected between the first rectifier 30 and a switching unit 45, and is inductively coupled with a second winding 42 according to a predetermined winding ratio.

A switching device 46 such as a bipolar or field effect transistor is provided in the switching unit 45 to connect and disconnect a current discharge path of the first winding 41. Alternatively, the switching device 46 may be connected between the first rectifier 30 and the first winding 41 to connect and disconnect the current path of the first winding 41.

The transformer circuit 40 inductively transforms energy supplied from the first rectifier 30 to the first winding 41 in the second winding 42 according to switching of switching unit 45. The switching unit 45 may be constructed to employ various power transforming methods (e.g., pushpull and half-bridge).

Energy induced in the second winding 42 of the transformer 40 charges a capacitor via a diode of a second rectifier 43. As a result, the second rectifier 43 generates a voltage supply required by the printer.

Figure 1:
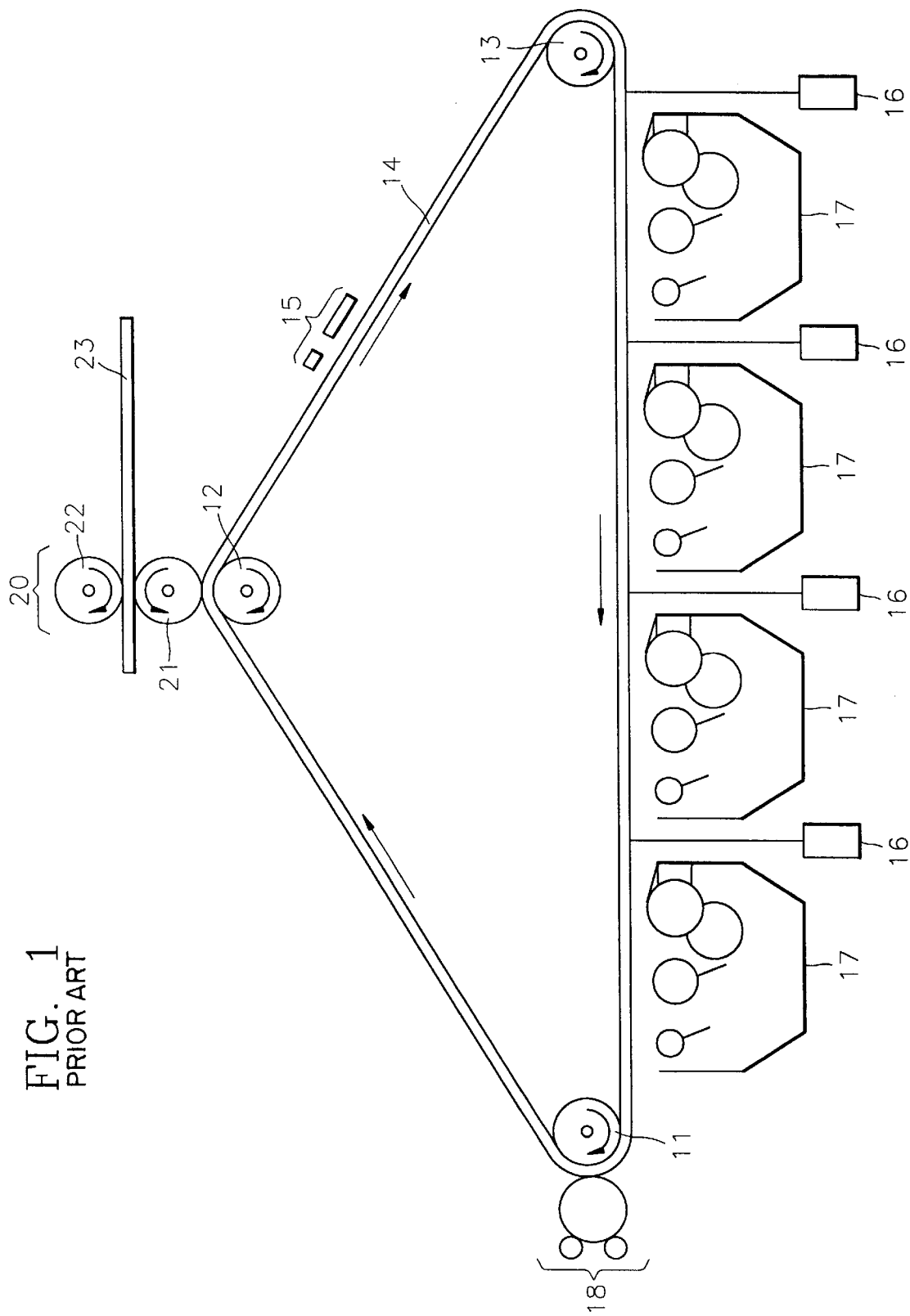
FIG. 1 is a sectional view of a typical printer.

The number of couplings and the winding ratio of the second winding 42 with respect to the first winding 41 are determined such that power is supplied to elements of a printer having a printer engine 48 including a resetting apparatus, laser scanning apparatuses, a transferring apparatus (see FIG. 1) and a system controlling unit 100. A base power supply of the second rectifier 43 supplied to the printer is categorized into power supplies of 24V and 12V for driving motors, and 5V for processing a logic signal.

A switching controlling unit 50 controlling the switching unit 45, controls on/off operation of the switching device 46 to maintain the amount of the power transferred to the second winding 42 such that the voltage level required by the system is maintained go within a predetermined range of the second rectifier 43. The switching controlling unit 50 may receive a voltage signal from the second rectifier 43 for controlling the on/off period of the switching device 46.

In the power transforming circuit, supply of the driving power to the switching controlling unit 50 is controlled based on the fact that the power of the first winding 41 is not transmitted to the second winding 42 when the switching device 46 of the switching unit 45 is switched off. Thus, the power supply to the printer is thereby controlled. The method of supplying and interrupting power to and from the printer by the power switch installed on a supply line between the external AC power supply 35 and the first rectifier 30 is, therefore, different from the conventional method.

A direct current (DC) voltage supply to be supplied to the switching controlling unit 50 is generated by a third rectifier 60. The energy delivered across a capacitor 64 constitutes the DC voltage supply. The typical switching controlling unit 50 requires a voltage of approximately 20V. Thus, the third rectifier 60 includes a transformer 62 for transforming the relatively high AC voltage of the external AC power supply 35 to a relatively low AC voltage according to a selected winding ratio, a bridge diode 61 for rectifying current induced in the secondary coil of the transformer 62, and the capacitor 64 charged by the rectified current.

The input line of the third rectifier 60 may be directly connected to the external AC power supply 35. Alternatively, the third rectifier 60 may also be constructed to obtain a required voltage by stepping down the output voltage of the first rectifier 30. The energy delivered to the third rectifier 60 is used to supply the power to the switching controlling unit 50, and drive a first switch operating unit, a second switch controlling unit 90 and a second switch 70. The first switch operating unit includes a first switch operating signal generator 80 and a comparator 85.

In the first switch operating signal generator 80, a voltage drop level due to the passage of current through a resistor R5 having one end connected to a ground line is output to a first input end 81 of the comparator 85 as a first reference voltage signal. Resistor R5 is serially connected with resistors R3 and R4 in parallel with the capacitor 64 which delivers the DC voltage supply. Also, if a first switch 83 is turned off, the voltage level across the capacitor 64 is output to a second input end 82 of the comparator 85 as a second voltage signal. On the other hand, if the first switch 83 is turned on, two resistors R6 and R7 and the first switch 83 are serially arranged in parallel with the capacitor 64 such that a voltage drop level due to passage of current through the resistance device R7 is output to the second input end 82 of the comparator 85 as a third voltage signal.

When the first switch 83 is turned on, the resistance values of the resistors R3 through R7 are determined such that the third voltage signal output to the second input end 82 has a voltage level lower than the first reference voltage signal.

The first switch 83 is installed on an outer circumference or surface of the printer such that it is accessible to be manually operated by a user similar to a conventional power supply switch.

The comparator 85 compares the first reference voltage signal input through the first input end 81 with the third voltage input signal having a different value according to the on/off state of the first switch 83 through the second input end 82.

The second switch 70 consisting of a relay, for example, is installed on a power supply line 65 and includes a switch member 71 capable of connecting or disconnecting both ends of the power supply line 65 according to change of a magnetic force, and a coil unit 72 causing the change of the magnetic force.

The second switch controlling unit 90 includes a switch device such as transistor 94 which is turned on according to signals from the comparator 85 and another switching device such as transistor 91 having one end connected to the coil unit 72 and the other end connected to the transistor 94, to connect and disconnect the current path from the DC voltage supply to the coil unit 72. The transistor 91 is switched on by first and second control signals output by the comparator 85 and the system controller 100, respectively. That is, if the first control signal output from the comparator 85 is a high level signal, a light emitting device 92 does not operate, so that a light receiving device 93 is open when receiving a light emitting signal to turn on the transistor 91, and, thus, a current passing path of the coil unit 72 is opened. If the first control signal of the comparator 85 is a low level signal, the light emitting device 92 and the light receiving device 93 are turned on, and the transistor 91 is switched on. Subsequently, current passes through the coil unit 72 and the switch member 71 is turned on.

In addition, a switch device 95 connected through a detour path is switched on/off by the system controlling unit 100 to control the light emission of the light emitting device 92. Thus, if the first control signal output from the comparator 85 is a low level signal or the second control signal output from the system controlling unit 100 is a high level signal, the second switch controlling unit 90 drives the switch member 71 to turn on.

Meanwhile, the first control signal of the comparator 85 output to the system controlling unit 100 supplies information concerning the on/off state of the first switch 83 which is, in essence, the power supply switch for the printer. That is, if the output signal of the comparator 85 is a low level, the system controlling unit 100 determines that the first switch 83 is in the "on" state, and if it is a high level, the system controlling unit 100 determines that the first switch 83 is in the "off" state.

In operation, if the external AC supply 35 and the power supply controller are connected through a plug (not shown), power from the external AC supply 35 is supplied to the first and third rectifiers 30 and 60, irrespective of the on/off state of the first switch 83.

If the first switch 83 is turned on, a first reference voltage signal and a third voltage signal having a level lower than that of the first reference voltage signal are input to the first and second input ends (81 and 82) of the comparator 85. As a result, the comparator 85 outputs a low level output signal since the third voltage signal is lower than the first reference voltage. Accordingly, the light emitting device 92 emits light according to the low level output signal of the comparator 85. If the light emitting device 92 emits light, the light receiving device 93 is turned on which, in turn, causes the transistor 91 to be switched on. As transistor 91 conducts current, coil 72 is energized, thereby turning on the switch member 71. Accordingly, power from the third rectifier 60 is supplied to the switching controlling unit 50 via switch 71. When the switching controlling unit 50 to which power is supplied controls the on/off operation of the switching unit 45, the power is induced in the second winding 42 to supply the power required for the printer.

If the first switch 83 is turned off by a user, the third voltage signal becomes higher than the first reference voltage causing the comparator to output a high level signal. The transistor 94 is turned off by the high level output signal of the comparator 85 causing the light emitting device 92 to be turned off, and thus causes the switch member 71 to be turned off, thereby interrupting the supply of power to the switching controlling unit 50. When the power supply to the switching controlling unit 50 is interrupted, the controlling unit 50 cannot turn on the switching unit 45, and thus the supply of power required for the printer is interrupted. Here, the first switch 83 functions as a conventional power supply switch.

Meanwhile, the on/off operation of the first switch 83 is supervised by the system controlling unit 100 receiving an output signal of the comparator 85. Thus, when the first switch 83 is turned off by the user during printing, the system controlling unit 100 immediately outputs a turn-on signal allowing the light emitting device 92 to emit light, even though the output level of the comparator 85 is high. The light emitting device 92 continues to emit light due to the output of the system controlling unit 100, so that the switch member 71 is maintained in an activated state. Thus, power for printer engine driving can be supplied from the second rectifier 43 via the switching controlling unit 50.

After completion of the printing, the system controlling unit 100 outputs a second control signal of low level such that the light emitting device 92 is turned off, thereby causing the supply of power for the switching controlling unit 50 to be interrupted. As a result, the power supply from the second rectifier 43 to the printer is interrupted. At this time, operation of the system controlling unit 100 receiving power through the output end of the second rectifier 43 is stopped by the interruption of power together with the printer engine 48. Thus, the printer is completely inactivated in which the operation cannot resume until the first switch 83 is turned on.

As described above, according to the power supply controlling apparatus for a printer of the present invention, even though the first switch capable of controlling the supply and interruption of power to the printer is turned off during printing due to carelessness, the supply of power required to complete the remaining printing operation can be continued, to thereby suppress contamination of the device due to forcible interruption of operation.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A power supply controlling apparatus for a printer comprising:

a first rectifier rectifying current supplied by an external alternating current (AC) power supply;

a switching unit for connecting and disconnecting a discharge path of current rectified in the first rectifier;

a switching controlling unit controlling the connection and disconnection operation of the switching unit;

a power supply line connected to the switching controlling unit for supplying power to the switching control unit;

a first switch operating unit for outputting a first control signal used to effect on and off switching of a connection of the power supply line to the switching controlling unit according to an on/off state of a first switch;

a second switch for switching the connection of the power supply line to the switching controlling unit;

a system controlling unit for controlling overall operations of the printer, receiving the first control signal to determine the on and off state of the first switch, determining a printing state, and outputting a second control signal which permits the second switch to be switched on and off based on the determinations of the first switch state and the printing state; and a second switch controlling unit receiving the first and second control signals to switch the second switch on and off.

2. The apparatus of claim 1, further comprising:

a transformer including at least one secondary winding inductively coupled with a first winding connected in the discharge path;

a second rectifier rectifying electric energy induced in the secondary winding to generate a voltage required for operation of the printer; and a third rectifier transforming power supplied by the external AC power supply to produce a direct current voltage for powering the switching controlling unit.

3. The apparatus of claim 1, wherein the first switch operating unit comprises:

a comparator comparing signals of first and second input ends and outputting a compared result as the first control signal; and a first switch operating signal generator supplying a first reference voltage signal to the first input end, and supplying one of a second voltage signal having a level higher than the first reference voltage level and a third voltage signal having a level lower than the first reference voltage level to the second input end according to the on/off state of the first switch.

4. The apparatus of claim 1, wherein the second switch comprises:

a switch member for connecting and interrupting the power supply line according to a change of a magnetic force; and a coil unit generating the change of the magnetic force according to continuity and interruption of current depending on control of the second switch controlling unit.

5. The apparatus of claim 4, wherein the second switch controlling unit comprises a switch device connected to an end of the coil unit having another end connected to a direct current voltage source to control continuity and interruption of current in the coil unit, the switch device being switched on according to the first and second control signals.

6. The apparatus of claim 1, wherein the first switch is installed in an outer circumference of the printer to allow a user to select between of on and off states of the first switch.

7. The apparatus of claim 2, wherein the first switch operating unit comprises:

a comparator comparing signals of first and second input ends and outputting a compared result as the first control signal; and a first switch operating signal generator supplying a first reference voltage signal to the first input end, and supplying one of a second voltage signal having a level higher than the first reference voltage level and a third voltage signal having a level lower than the first reference voltage level to the second input end according to the on/off state of the first switch.

8. The apparatus of claim 2, wherein the second switch comprises:

a switch member capable of connecting and interrupting the power supply line according to a change of a magnetic force; and a coil unit generating the change of the magnetic force according to continuity and interruption of current depending on control of the second switch controlling unit.

9. The apparatus of claim 8, wherein the second switch controlling unit comprises a switch device connected to a end of the coil unit having another end connected to the direct current (DC) voltage source supplied by the third rectifier to control continuity and interruption of current of the coil unit, the switch device being switched on according to the first and second control signals.

10. The apparatus of claim 2, wherein the system controlling unit receives a voltage source supplied by the second rectifier as driving power.

11. The apparatus of claim 2, wherein the first switch is installed on an outer circumference of the printer to allow a user to select between on and off states of the first switch.

* * * * *